(12) United States Patent
Fujiwara et al.

(10) Patent No.: US 7,064,920 B2
(45) Date of Patent: Jun. 20, 2006

(54) DISK DRIVE AND BREATHER FILTER HAVING MULTIPLE VENTILATION PATHS AND METHOD OF INSPECTING SAME

(75) Inventors: Takayuki Fujiwara, Hachioji (JP); Hiroki Kitahori, Fujisawa (JP); Hiroshi Matsuda, Zama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 174 days.

(21) Appl. No.: 10/467,735

(22) PCT Filed: Feb. 13, 2002

(86) PCT No.: PCT/GB02/00630

§ 371 (c)(1),
(2), (4) Date: Jan. 27, 2004

(87) PCT Pub. No.: WO02/065474

PCT Pub. Date: Aug. 22, 2002

(65) Prior Publication Data

US 2004/0114273 A1 Jun. 17, 2004

(30) Foreign Application Priority Data

Feb. 13, 2001 (JP) .............................. 2001-036210

(51) Int. Cl.
*G11B 33/14* (2006.01)
(52) U.S. Cl. .................................................. 360/97.02
(58) Field of Classification Search ............. 360/97.02
See application file for complete search history.

(56) References Cited

U.S. PATENT DOCUMENTS

| 5,030,260 | A | * | 7/1991 | Beck et al. | .................... 96/139 |
| 5,997,614 | A | * | 12/1999 | Tuma et al. | ...................... 96/4 |
| 6,395,073 | B1 | * | 5/2002 | Dauber | ........................ 96/134 |
| 6,683,746 | B1 | * | 1/2004 | Kuroki et al. | ........... 360/97.02 |

OTHER PUBLICATIONS

"Additional Path for HDD Breather Hole"Research Disclosure, Feb. 2000, pp. 385-386, No. 430, Kenneth MasonPublications, Hampshire, Great Britain.
"Laminar Flow Thin Chemical Breather Filter for Direct Access Storage Device"IBM Technical Disclosure Bulletin, 1992, pp. 341-342, vol. 34, No. 8, IBM Corporation, New York, U.S.

(Continued)

*Primary Examiner*—A. J. Heinz
(74) *Attorney, Agent, or Firm*—Bracewell & Giuliani LLP (57) ABSTRACT

A disk drive has an internal breather filter that performs a filtration function while maintaining ventilation with an exterior of the drive. The filter circulates a gas between an interior and the exterior of its enclosure. The enclosure includes a first ventilation path for circulating the gas from the exterior to the filter, and a second ventilation path for circulating the gas from the filter to the exterior. In addition, a method of inspecting the filter and disk drive is disclosed. The method includes a compressing and decompressing step of compressing and decompressing the inside of the enclosure, a measuring step of measuring pressure in the enclosure, and a judging step of judging whether attachment of the filter is adequate on the basis of a value of the pressure measured.

10 Claims, 11 Drawing Sheets

OTHER PUBLICATIONS

"Breather Filter Structure Having Diffusion Channel on Plate"IBM Technical Disclosure Bulletin, Jun. 1, 1995, pp. 93-94, vol. 38, No. 6, IBM Corporation, New York, U.S.

"Snorkel Breather Filter"IBM Technical Disclosure Bulletin, May 1, 1990, p. 37, vol. 32, No. 12, IBM Corporation, New York, U.S.

* cited by examiner

DISK DRIVE AND BREATHER FILTER HAVING MULTIPLE VENTILATION PATHS AND METHOD OF INSPECTING SAME

This national stage application claims the benefit of Japanese Patent Application No. 2001-036210, filed on 13 Feb. 2001.

This application is a 371 of PCT/GB02/00630 Feb. 13, 2002.

FIELD OF THE INVENTION

The present invention relates to a disk drive apparatus represented by a hard disk drive, and in particular, to the attachment structure of a filter for preventing the entry of dust into a disk drive apparatus.

BACKGROUND OF THE INVENTION

Hard disk drives (hereinafter, HDDS) most common as data storage means of computers each have the structure that a single magnetic disk or plural disk platters of magnetic disk are coaxially arranged on a shaft, and are driven by a spindle motor. A magnetic head provided with facing the above-described magnetic disk read and writes data, and this magnetic head is driven by an actuator, that is, generally, a voice coil motor (hereinafter, a VCM). The above-described magnetic disk, magnetic head, and actuator are contained in an enclosure called a disk enclosure. The disk enclosure consists of, for example, a shallow box-like base made of an aluminum alloy, and a top cover sealing an opening of the base. A gasket is provided in the circumference of the top cover facing the base. Hence, by assembling the base and top cover so that this gasket may be pressed to the edge side of the peripheral wall of the base, the inside of the disk enclosure can be hermetically sealed.

In the disk enclosure, temperature rises under the influence of the magnetic disk rotation and the like. Here, it is assumed that air in the disk enclosure that expands in connection with the temperature rise pushes the gasket aside and leaks outside. It is supposed that, if the temperature in the disk enclosure lowers, the air in the disk enclosure is shrunk, and now, on the contrary, air enters into the disk enclosure from the outside. At this time, if dust, vaporized organic substances, or vaporized inorganic substances enter into the disk enclosure with the air entering, the dust, above-described organic substances, or inorganic substances that are solidified collide against the magnetic head at the time of using the HDD to damage the magnetic head or magnetic disk. In order to prevent such entry of dust into the disk enclosure, a filter is provided in a top cover or a base in an actual HDD. This filter is called a breather filter. While becoming a passage for circulating air with the outside in connection with dilatation and contraction of the air in the disk enclosure caused by the temperature rise and fall, the filter reduces the entry of the dust, vaporized organic substances, or inorganic substances from the outside below such an amount that apparatus performance is not affected.

A conventional breather filter will be described with referring to drawings. In addition, the breather filter will be described in the case where it is attached to a top cover, although there are a case where it is attached to a top cover and a case where it is attached to a base.

Figure 13:
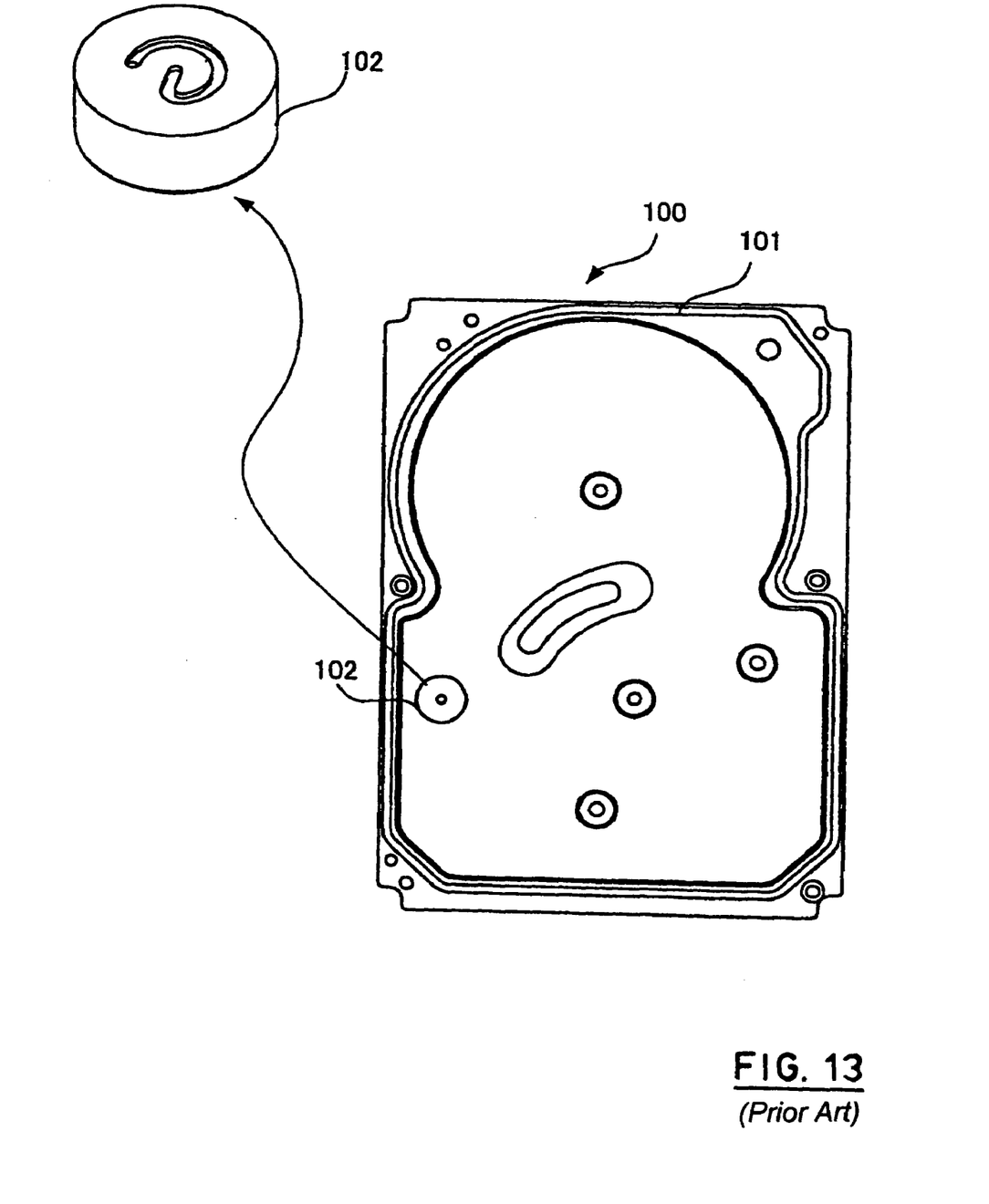
FIG. 13 is a plan showing the back face of a conventional top cover.

FIG. 13 is a plan showing the back face of a top cover 100. Here, it is assumed that, at the top cover 100, a face exposed to the outside at the time of constituting the disk enclosure is called a front face and a face facing the inside of the disk enclosure and opposite to a base is called a back face. A gasket 101 for acquiring the hermeticity of the disk enclosure is stuck on the back face of the top cover 100 at the circumference thereof. Moreover, the breather filter 102 is stuck on the back face of the top cover 100 by double-sided adhesive tape. FIG. 13 also shows a perspective view of a breather filter 102 as well. In addition, the breather filter 102 shown in FIG. 13 is shown with a face, which is stuck on the top cover 100, being upward.

Figure 14:
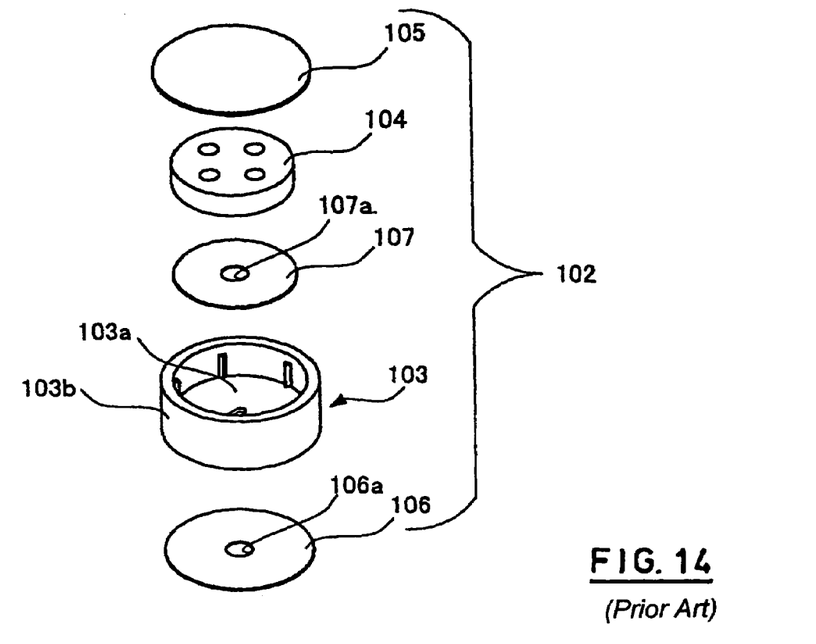
FIG. 14 is an assembly view showing the conventional breather filter.

FIG. 14 is an assembly view of the breather filter 102. In addition, FIG. 14 shows the breather filter 102 with turning down the face stuck on the top cover 100. As shown in FIG. 14, the breather filter 102 mainly consists of a filter case 103, a filter body 104 contained in the filter case 103, and a permeable film 105 covering a surface of the filter body 104. In addition, FIG. 15A shows a front face of the filter case 103 and FIG. 15B shows a back face thereof.

Figure 15:
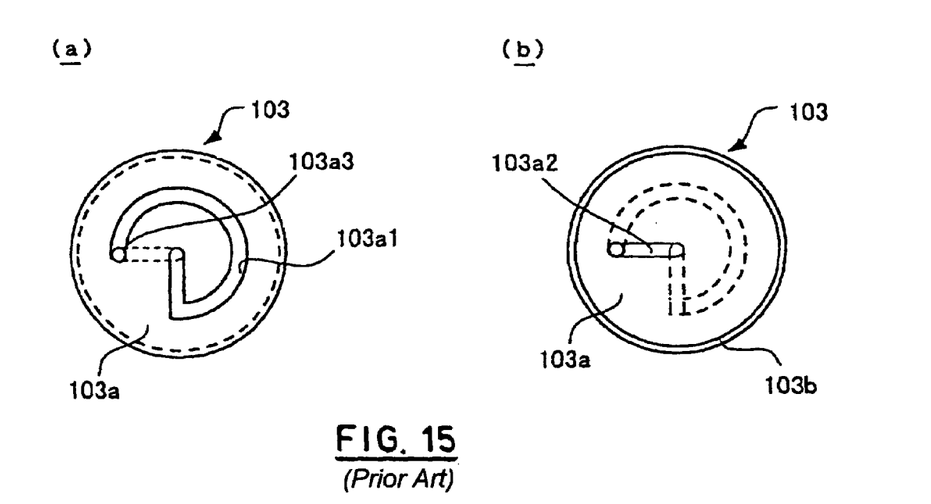

In FIGS. 14, 15A, and 15B, the filter case 103 consists of a circular bottom wall 103a and peripheral wall 103b standing up from the circumference of the bottom wall 103a. A ventilation slot 103a1 is formed in the front face of the bottom wall 103a, and the ventilation slot 103a2 is formed in the back face. In addition, it is assumed that the front face of the bottom wall 103a in the filter case 103 means a lower face shown in a central portion of FIG. 14, and, the back face means an upper face shown in the central portion of FIG. 14. The ventilation slot 103a1 formed in the front face of the bottom wall 103a is a circular slot that starts from the center of the bottom wall 103a and stops at a ventilation hole 103a3 feeding through the bottom wall 103a. The ventilation slot 103a2 formed in the back face of the bottom wall 103a starts from the ventilation hole 103a3 and stops at the center of the bottom wall 103a. Thus, the ventilation slot 103a1 and the ventilation slot 103a2 communicate through the ventilation hole 103a3.

Double-sided adhesive tape 106 is stuck on the front face of the bottom wall 103a of the filter case 103, and double-sided adhesive tape 107 is stuck on the back face thereof. Therefore, the ventilation slot 103a1 forms a closed space with the double-sided adhesive tape 106, and the ventilation slot 103a2 forms a closed space with the double-sided adhesive tape 107. However, as shown in FIG. 14, since through holes 106a and 107a are formed in the centers of the double-sided adhesive tape 106 and the double-sided adhesive tape 107, parts corresponding to these holes communicate with the outside.

The filter body 104 is contained in the filter case 103. At this time, the filter body 104 is stuck and fixed by the double-sided adhesive tape 107 stuck on the back face of the bottom wall 103a. However, the fixing of the filter body 104 is not limited to the double-sided adhesive tape 107, but it is possible to use a mechanical constraint by a protrusion by providing the protrusion such as a rib in the filter case 103. The permeable film 105 is stuck on the upper face of the filter body 104 shown in a central portion of FIG. 14, and the breather filter 102 is united in one piece in this way.

Figure 16:
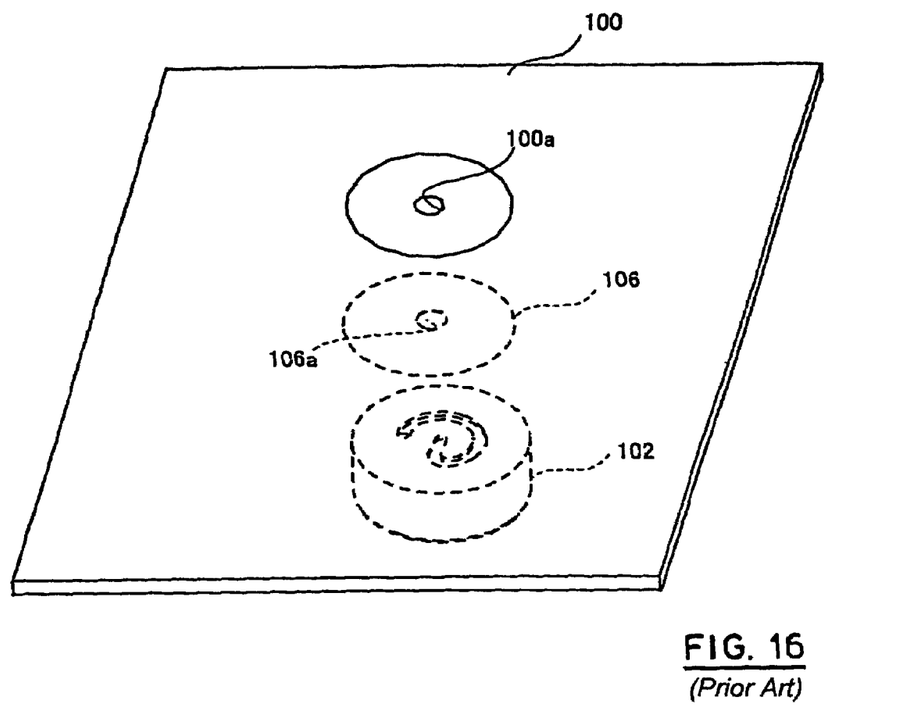
FIG. 16 is a sectional view showing a state of the breather filter being attached to the conventional top cover.
Figure 17:
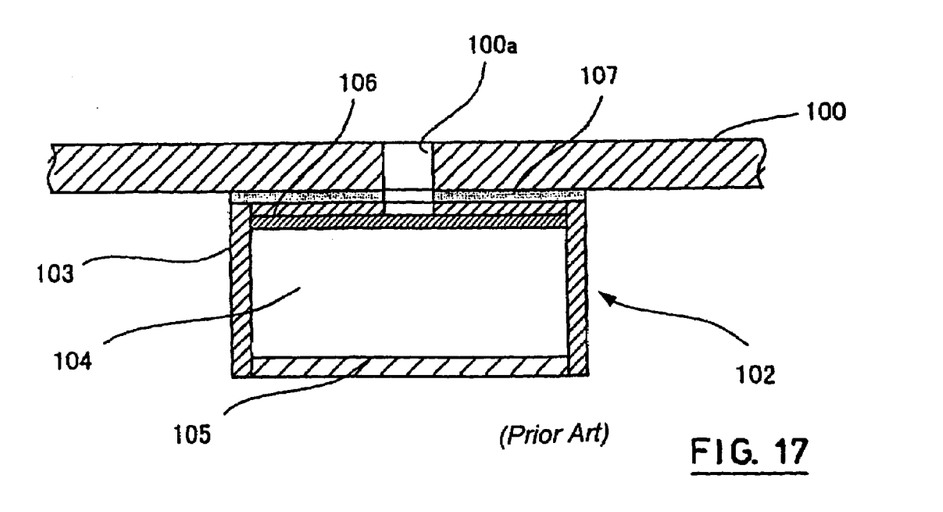
FIG. 17 is a sectional view of the conventional top cover.

The breather filter 102 is stuck on the top cover 100 through the double-sided adhesive tape 106 stuck on the front face of the bottom wall 103a. These conditions are shown in FIGS. 16 and 17. That is, a fresh air hole 100a formed in the top cover 100, the through hole 106a of the double-sided adhesive tape 106, and the breather filter 102 are centered, and the breather filter 102 is fixed to the top cover 100 by the double-sided adhesive tape 106.

When the air in the disk enclosure expands, air flows out to the outside in the following paths. That is, the air in the disk enclosure sequentially passes the permeability film 105, filter body 104, through hole 107a of the double-sided adhesive tape 107, the ventilation slot 103a2, ventilation hole 103a3, ventilation slot 103a1, through hole 106a of the double-sided adhesive tape 106, and the fresh air hole 100a of the top cover 100, and flows out to the outside. On the other hand, when the temperature in the disk enclosure lowers and fresh air flows into the disk enclosure, the fresh air sequentially passes the fresh air hole 100a of the top cover 100, through hole 106a of the double-sided adhesive tape 106, ventilation slot 103a1, ventilation hole 103a3, ventilation slot 103a2, through hole 107a of the double-sided adhesive tape 107, filter body 104, and permeable film 105. Even if dust, and vaporized organic substances or vaporized inorganic substances are mixed with the air flowing in, the air passes the filter body 104, whose principal component is activated carbon, and the permeable film 105. Hence, it is possible to reduce the entry of dust into the disk enclosure to a minute amount in such degree that the dust does not affect the apparatus performance.

Conventionally, the breather filter 102 is attached to the top cover 100 by manual operation. However, the top cover 100 may be assembled to a base without the breather filter 102 being attached. It is not easy to confirm whether the breather filter 102 has been attached to the top cover 100 after the top cover 100 and the base are assembled. Although there is also a method of confirming the presence of the breather filter 102 from fresh air hole 100a formed in the top cover 100, it does not become an exact confirmation method because of the fresh air hole 100a having only small diameter.

Moreover, the adhesion by the double-sided adhesive tape 107 may be insufficient even though the breather filter 102 has been attached to the top cover 100. In that case also, conventionally, it is not easy to confirm it.

Then, a subject of the present invention is to provide a method for making it possible to easily confirm whether the breather filter 102 is attached even after the top cover 100 is assembled to the base.

Furthermore, another subject of the present invention is to provide a method for making it possible to easily confirm whether the breather filter 102 is adequately attached to the top cover 100 even after the top cover 100 is assembled to the base.

DISCLOSURE OF THE INVENTION

Heretofore, a leak test for confirming whether the hermeticity inside the disk enclosure is kept is performed after the top cover 100 is assembled to the base. This leak test is a test for judging whether the hermeticity inside the disk enclosure is kept by blowing a gas into the disk enclosure through the fresh air hole 100a of the top cover 100, and measuring the pressure of the gas. In addition, it is also possible as a leak test to judge whether the hermeticity is kept by decompressing the inside of the disk enclosure. The present inventor examined whether it was possible to judge whether the breather filter 102 was attached with using this leak test. Consequently, it was found that, by forming a through hole within an area where the breather filter 102 of the top cover 100 was attached and arranged, it was possible to confirm whether the breather filter 102 was attached at the time of the leak test. Since this through hole is sealed when the breather filter 102 is attached, a gas does not leak outside from this through hole at the time of the leak test. However, when the breather filter 102 is not attached, since the blown gas leaks from this through hole, it is possible to know that the breather filter 102 is not attached, by measuring pressure.

The present invention is based on the above knowledge, and is characterized in that a disk drive apparatus comprises: a disk-like medium which is rotatably driven with centering about a rotating shaft and stores data; an actuator which has a head, which reads data from and writes data to the disk-like medium, and swings with centering about a rotation shaft; an enclosure contains the disk-like medium and the actuator; and a filter circulating a gas between the inside of the enclosure and the outside, and is attached to the enclosure, the enclosure comprising a first ventilation path for circulating a gas between the outside and the filter and a second ventilation path formed in an area in which the filter is attached.

In the disk drive apparatus of the present invention, the above-described enclosure can have a plurality of above-described second ventilation paths. Moreover, in the disk drive apparatus of the present invention, the above-described plurality of second ventilation paths can be also formed in positions symmetrical with reference to the above-described first ventilation path. The present invention can also judge whether not only a filter is present but also the filter is adequately attached. In this case, an attachment failure can be detected with more sufficient precision by forming a plurality of second ventilation paths, or forming the plurality of second ventilation paths in positions symmetrical with reference to the first ventilation path, which will be described later.

There is an HDD as an example of a typical application of a disk drive apparatus according to the present invention. Therefore, the present invention provides a hard disk drive comprising: a magnetic disk storing data magnetically; a spindle motor rotatably driving the magnetic disk; a rotary actuator which has a magnetic head for writing data to and reading data from the magnetic disk, makes the magnetic head seek the magnetic disk, and swings with centering about a pivot; a disk enclosure which contains the magnetic disk, the spindle motor, and the rotary actuator, and includes a box-like base having an opening, and a cover sealing the opening; and a breather filter which circulates a gas between the disk enclosure and the outside, and is attached to the disk enclosure, the disk enclosure comprising a gas circulation path for circulating a gas between the outside and the breather filter, and a feed-through path formed within an area required in order to attach the breather filter in the disk enclosure.

In the hard disk drive of the present invention, it becomes possible to detect the presence or an attachment failure of the breather filter at the time of the leak test by forming a feed-through path in an area required in order to attach the breather filter in the disk enclosure. In addition, in the present invention, the area required for attaching the breather filter to the disk enclosure is not restricted to a projection plane of the breather filter to the disk enclosure. For example, a plane of projection of a member, used in order to attach the breather filter in the disk enclosure, such as double-sided adhesive tape is also included. Usually, areas of the attachment face of the breather filter and the double-sided adhesive tape mostly coincide as described previously. The present invention can be functioned if the above-described feed-through path is formed within the projection plane of the double-sided adhesive tape even if the projection plane of the breather filter to the disk enclosure is out of range, when the area of the double-sided adhesive tape is larger than the attachment area of the breather filter.

Therefore, in the hard disk drive according to the present invention, when the above-described breather filter is attached to the above-described disk enclosure with an adhesive (for example, double-sided adhesive tape), the above-described area turns into an area where the above-described adhesive is applied.

The disk enclosure of a hard disk drive consists of a cover and a base fundamentally. Therefore, in the hard disk drive according to the present invention, the above-described gas circulation path and the above-described feed-through path can be formed in the above-described cover, and the above-described breather filter can be attached to the above-described cover. Furthermore, the above-described gas circulation path and the above-described feed-through path can be formed in the above-described base, and the above-described breather filter can be attached to the above-described base.

The present invention is provided also as a cover that constitutes the disk enclosure of a hard disk drive in addition to the above-described hard disk drive. The cover according to the present invention is characterized in being a cover which constitutes a disk enclosure of a hard disk drive with a box-like base, and in which a breather filter is attached to place, comprising: a plate-like cover body; a first ventilation path making it possible to perform ventilation to the breather filter formed in the cover body; and a second ventilation path that is formed in the cover body and sealed when the breather filter is adequately attached to the cover.

In the cover according to the present invention, the above-described second ventilation path is formed in the position that is not sealed when the above-described breather filter is not attached to the above-described cover.

The present invention permits preparing a breather filter in a base side. Therefore, the present invention provides a base which constitutes a disk enclosure of a hard disk drive with a plate-like cover, and a breather filter is attached to place, comprising a box-like base body consisting of a bottom and side walls; a first ventilation path making it possible to perform ventilation to the breather filter formed in the bottom of the base body; and a second ventilation path which is a bottom of the base body, and is formed within an area where the breather filter will be attached.

In the base according to the present invention, the above-described second ventilation path can be formed so that the above-described first ventilation path may be surrounded. Then, as described later, it is possible to increase the detection precision of an attachment failure of the breather filter.

The present invention has novelty at the point of judging whether the attachment of a breather filter is adequate in the leak test which is performed about the conventional hard disk drive as described above. Hence, the present invention provides an inspection method of a disk drive apparatus that comprises an enclosure which contains a disk-like medium storing data, and a head that reads data from and writes data to the disk-like medium, and a filter which is attached to the inside of the enclosure, and achieves a filtration function with maintaining ventilation with the outside, comprising: a compressing and decompressing step of compressing and decompressing the inside of the enclosure; a measuring step of measuring pressure in the enclosure; and a judging step of judging whether attachment of the filter is adequate on the basis of a value of the pressure measured.

In the inspection method of a disk drive apparatus according to the present invention, the above-mentioned enclosure has a ventilation path where, in case of the inadequate attachment of the filter, at the compressing and decompressing step, a gas inside the enclosure leaks to the outside when the inside of the enclosure is compressed, and a gas flows into the inside of the enclosure when the inside of the enclosure is decompressed.

In addition, in the inspection method of the disk drive apparatus according to the present invention, wherein whether the attachment of the above-mentioned filter is adequate includes that the above-mentioned filter is not attached to the above-mentioned enclosure, and/or that the attachment to the above-mentioned enclosure of the above-mentioned filter is inadequate.

BRIEF DESCRIPTION OF THE DRAWINGS

FIGS. 15A and 15B are plans showing a filter case constituting the conventional breather filter, FIG. 15A shows the top face, and FIG. 15B shows the back face;

PREFERRED EMBODIMENTS

Figure 1:
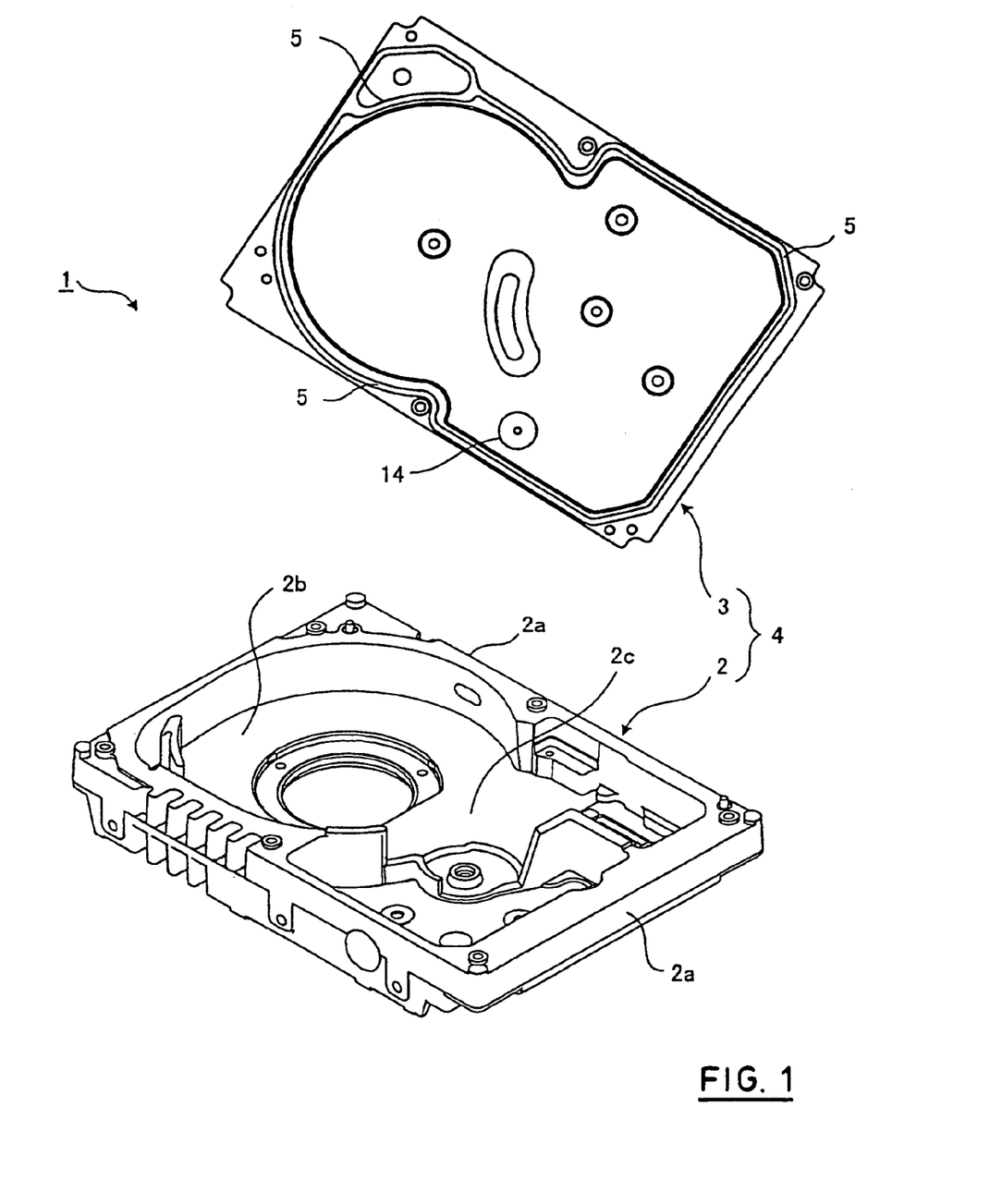
FIG. 1 is a perspective view showing a structure of a disk enclosure constituting an HDD according to a first embodiment.
Figure 2:
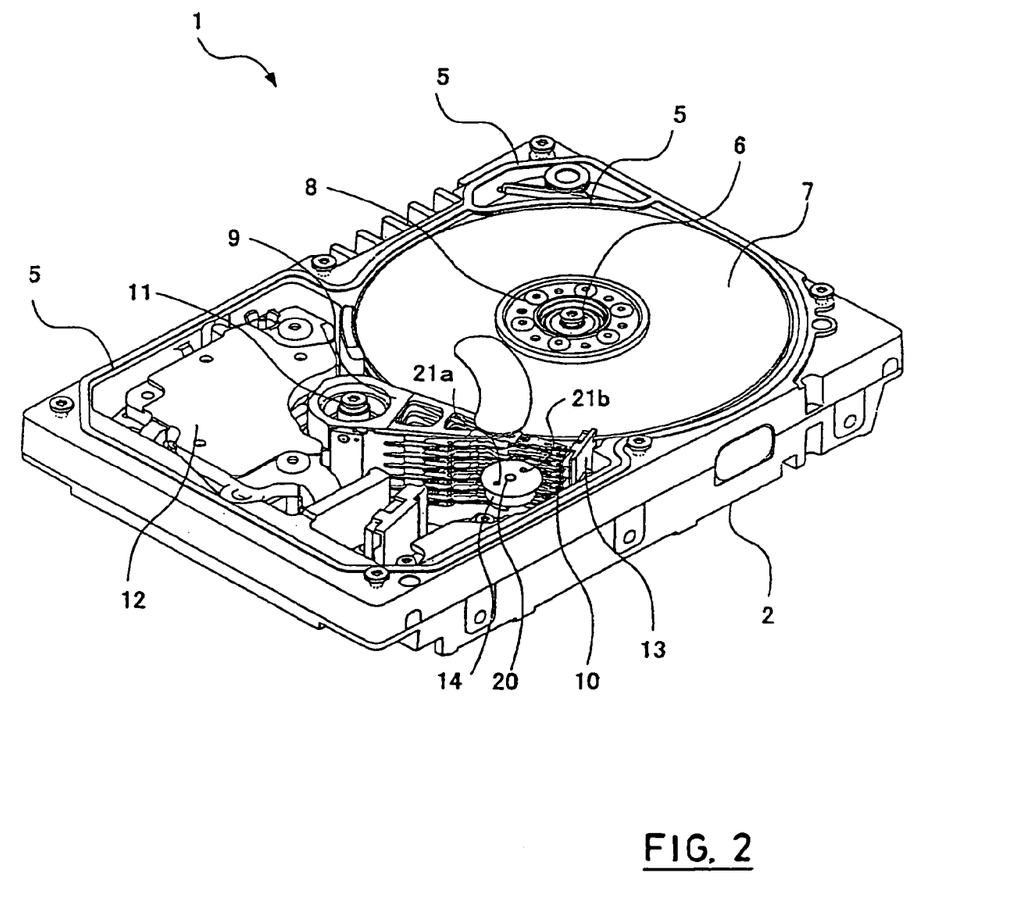
FIG. 2 is a perspective view showing an insider of the HDD according to the first embodiment.

Hereinafter, an example that a disk drive apparatus according to the present invention is applied to a hard disk drive (HDD) 1 will be described with referring to drawings. FIG. 1 is a perspective view showing the structure of a disk enclosure 4 constituting an HDD 1 according to this embodiment, and FIG. 2 is a perspective view showing the inside of the HDD 1 according to this embodiment. In addition, FIG. 2 is a perspective view without a top cover 3.

As shown in FIGS. 1 and 2, the HDD 1 constitutes a disk enclosure 4 by sealing an opening of the base 2, which is made of an aluminum alloy and has a shape of a shallow box, with the top cover 3.

A gasket 5 is stuck on the back face of the top cover 3. The gasket 5 can be made of, for example, fluororubber. Since the top cover 3 is screwed to the base 2 through the gasket 5, the inside of the disk enclosure 4 is hermetically sealed.

In this disk enclosure 4, as shown in FIG. 2, a spindle motor 6 having hub-in structure is provided in the approximate center of the base 2. Disk platters of a magnetic disk 7 that are made of glass or aluminum substrates are coaxially stacked on an upper surface of a hub of this spindle motor 6 through spacers (not shown), and fixed with the top clamp 8. The spindle motor 6 rotatably drives the magnetic disk 7.

Moreover, an actuator 9 is provided in the disk enclosure 4. This actuator 9 has a magnetic head 10 reading and writing data in one end portion thereof, its middle portion is supported on the base 2 through a pivot shaft 11 for the actuator 9 to be made to be rotatable around the pivot shaft 11. A VCM (voice coil motor) coil is provided in another edge of the actuator 9, and the actuator 9 is rotatably driven by a VCM 12 provided in the disk enclosure 4 so as to function with this coil for a VCM.

A card not shown is attached as a circuit board in the outer surface (lower surface) of the base 2, the card whose shape is a rectangle having the size of covering a half of the external surface of the base 2. The I/O operation of power and signals for motor drive, and the like is performed between the above-described card and spindle motor 6. In addition, the I/O operation of power and signals for motive energy to the VCM coil, reading of the magnetic head 10, and the like is performed between the card and actuator 9. This I/O operation between the card and actuator 9 is performed through a flexible cable (FPC).

The HDD 1 of this embodiment is a disk drive apparatus called a head load/unload type. This head load/unload type HDD makes a ramp block 13 hold the actuator 9 in non-operational time. When the actuator 9 drives the magnetic head 10 in operational time, the magnetic head 10 moves towards the magnetic disk 7 from the ramp block 13, and seeks over the magnetic disk 7.

A peripheral wall 2a is provided with standing up on the periphery of the base 2. The base 2 is divided into a plurality of zones as follows. That is, in an area surrounded by the peripheral wall 2a, there are a disk containing room 2b as a medium containing room that contains a disk assembly consisting of the magnetic disk 7 and the spindle motor 6 for rotatably driving the magnetic disk 7, and an actuator containing room 2c which contains an actuator mechanism for making the magnetic head 10 seek over the magnetic disk 7.

A gasket 5 for keeping the hermeticity of the HDD 1 to the outside is stuck on the back face of the top cover 3. Moreover, a breather filter 14 is attached to the top cover 3. Since the breather filter 14 has the same structure as that described in FIG. 14, the explanation is omitted. A fresh air hole 20 is formed in the top cover 3 as a first ventilation path for making the breather filter 14 and the outside communicate with each other. The fresh air hole 20 is a through hole formed in the top cover 3. Moreover, filter confirmation hole 21a and 21b whose diameters are a little bit smaller than that of the fresh air hole 20 are formed around the fresh air hole 20 as a second ventilation path. The filter confirmation holes 21a and 21b are also through holes formed in the top cover 3.

Figure 3:
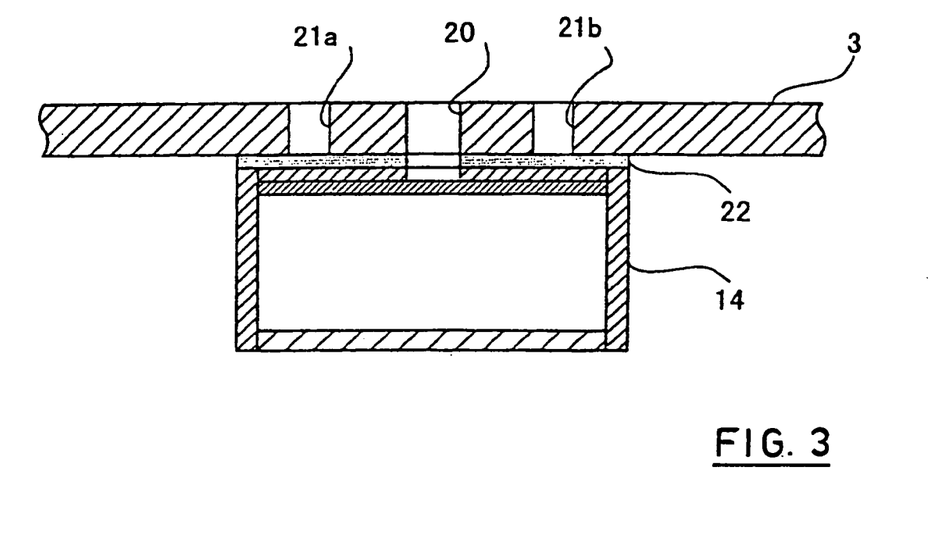
FIG. 3 is a sectional view of a breather filter attachment portion according to the first embodiment.

FIG. 3 is a sectional view showing the vicinity of the breather filter 14. As shown in FIG. 3, the breather filter 14 is attached to the top cover 3 with double-sided adhesive tape 22 as an adhesive. Under the present circumstances, the breather filter 14 is attached to the top cover 3 so that the fresh air hole 20, formed in the top cover 3, and the center of the breather filter 14 may coincide. Moreover, it can be seen that the filter confirmation holes 21a and 21b are formed within an area where the breather filter 14 will be attached. This means that the filter confirmation holes 21a and 21b are formed in an area necessary for attaching the breather filter 14 in the top cover 3. As shown in FIG. 3, the filter confirmation holes 21a and 21b will be sealed by the breather filter 14 when the breather filter 14 is attached.

Here, a leak test is a test of measuring pressure with introducing a compressed gas into the HDD 1 through the breather filter 14. Conventionally, this leak test is performed for confirming the hermeticity in the disk enclosure 4, and more concretely, whether the gasket 5 is functioning effectively. However, according to this embodiment, it is possible to inspect whether the breather filter 14 is attached to the top cover 3, as well as the hermeticity in the disk enclosure 4.

Figure 4:
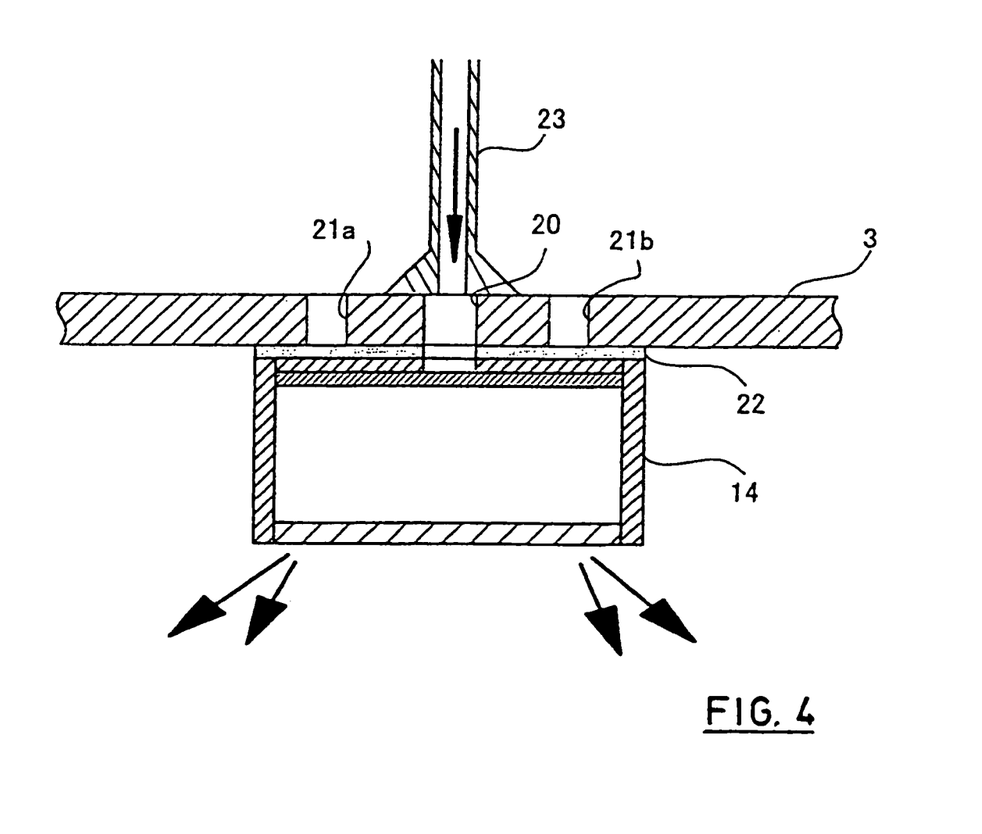
FIG. 4 is a sectional view showing the breather filter attachment portion according to the first embodiment at the time of a leak test.
Figure 5:
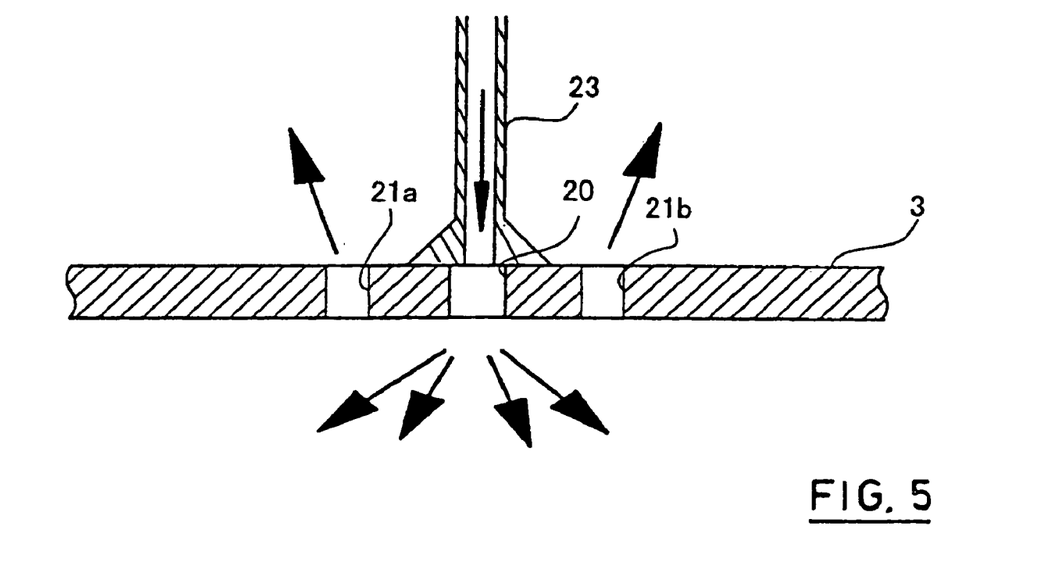
FIG. 5 is a sectional view showing a breather filter attachment portion according to the first embodiment at the time of a leak test.

FIG. 4 is a sectional view showing the situation that the leak test is performed for the HDD 1 where the breather filter 14 is attached to the top cover 3. Moreover, FIG. 5 is a sectional view showing the situation that the leak test is performed for the HDD 1 where the breather filter 14 is not attached to the top cover 3. As shown in FIG. 4, if the breather filter 14 is attached to the top cover 3, the compressed gas (shown by arrows) supplied from a leak test tube 23 is supplied into the disk enclosure 4 through the breather filter 14. Here, the filter confirmation holes 21a and 21b are sealed by the breather filter 14, and more concretely, by the double-sided adhesive tape 22 for attaching the breather filter 14 to the top cover 3. Therefore, if the gas introduced in the disk enclosure 4 leaks to the outside, the gas will leak between the gasket 5 and base 2. In addition, the filter confirmation holes 21a and 21b should not be blocked by the leak test tube 23 during the leak test. In case of using the leak test tube 23 having a form as shown in FIG. 4, it is also necessary to take this point into consideration when forming the filter confirmation holes 21a and 21b. On the other hand, as shown in FIG. 5, supposing the breather filter 14 is not attached in the top cover 3, a part of the compressed gas (shown by arrows) supplied from the leak test tube 23 will leak to the outside from the filter confirmation holes 21a and 21b of the top cover 3. It is possible to easily judge the leakage of the gas from the filter confirmation holes 21a and 21b to the outside by detecting the pressure of the compressed gas supplied from the leak test tube 23. An example of a concrete judging method is as follows.

It is assumed that, for example, a reference pressure in the case where the hermeticity between the base 2 and top cover 3 is kept by the gasket 5 and the breather filter 14 is attached is V1. If the pressure at the time of actually performing a leak test coincides with V1, the HDD 1 is treated as an accepted product. It is supposed that the hermeticity between the base 2 and top cover 3 by the gasket 5 is not kept or the breather filter 14 is not attached in case the pressure at the time of actually performing the leak test is V2 lower than V1. Then, it is possible to confirm whether the breather filter 14 is attached by removing the top cover 3 from the base 2 and confirming the back face of the top cover 3. If the breather filter 14 is attached, it is possible to judge that a cause of V2 being detected at the leak test is that the hermeticity between the base 2 and top cover 3 by the gasket 5 is not kept.

There is also another method as follows. The pressure V3 in the case where the hermeticity between the base 2 and the top cover 3 by the gasket 5 is kept but the breather filter 14 is not attached is measured beforehand. Moreover, the pressure V4 in the case where the breather filter 14 is attached but the hermeticity between the base 2 and the top cover 3 by the gasket 5 is not kept is measured beforehand. Furthermore, the pressure V5 in the case where the hermeticity between the base 2 and the top cover 3 by the gasket 5 is not kept and the breather filter 14 is not attached is measured beforehand. Then, it is possible to judge whether the HDD 1 concerned is an accepted product or to predict the cause in the case of a rejected product by comparing the pressure, measured at the time of the leak test, with V1, V3, V4, and V5.

Figure 11:
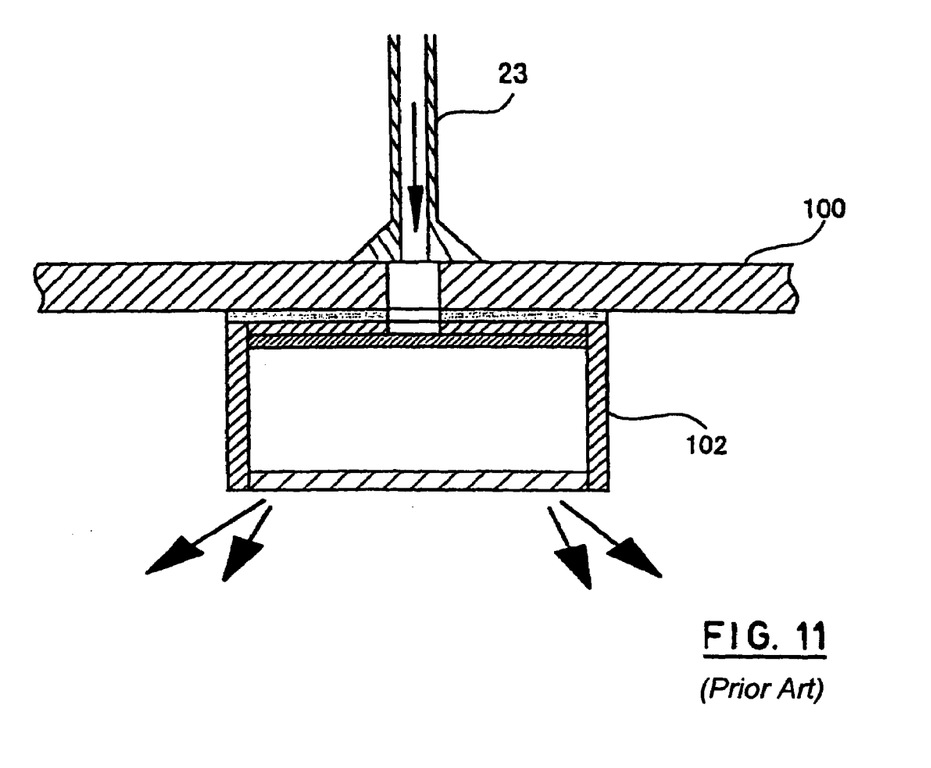
FIG. 11 is a sectional view showing the vicinity of a breather filter at the time of a leak test for a conventional HDD.
Figure 12:
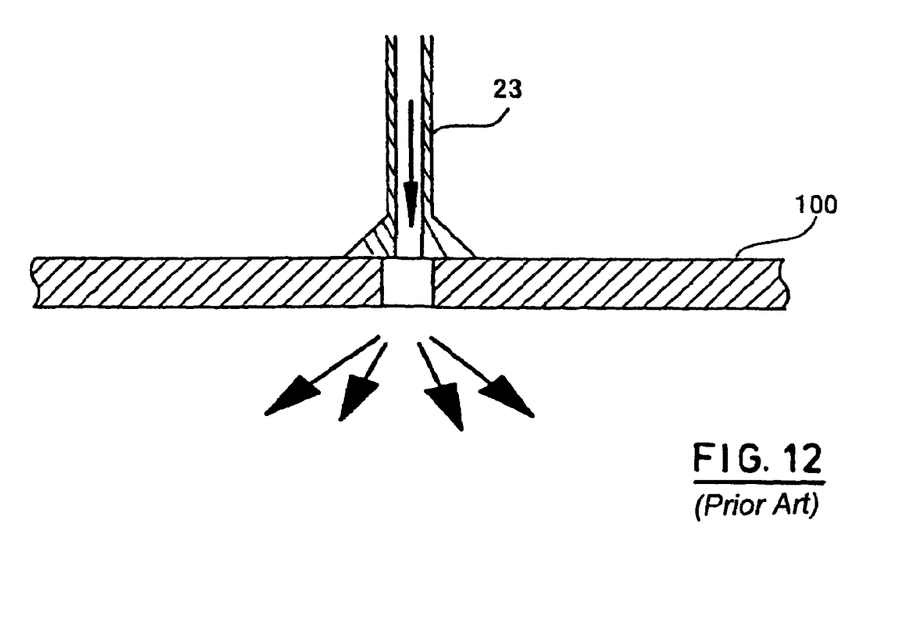
FIG. 12 is a sectional view showing the vicinity of a breather filter at the time of a leak test for a conventional HDD.

On the other hand, in the conventional top cover 100 described above, it is not possible to judge whether the breather filter 102 is attached to the top cover 100 with the leak test like this embodiment. This will be described on the basis of FIGS. 11 and 12. FIG. 11 is a sectional view showing the situation that a leak test is performed for an HDD where a breather filter 102 is attached to a top cover 100. FIG. 12 is a sectional view showing the situation that a leak test is performed to an HDD where the breather filter 102 is not attached to the top cover 100. As shown in FIGS. 11 and 12, through holes equivalent to the filter confirmation holes 21*a* and 21*b* that this embodiment provides are not provided in the top cover 100.

As shown in FIG. 11, when the breather filter 102 is attached to the top cover 100, the compressed gas (shown by arrows) supplied from a leak test tube 23 will be supplied in the disk enclosure through the breather filter 102. Moreover, as shown in FIG. 12, if the breather filter 102 is not attached to the top cover 100, the compressed gas (shown by arrows) supplied from the leak test tube 23 directly flows into the disk enclosure. At this time, in case the gas flowing into the disk enclosure leaks to the outside, the gas leaks from between the top cover 100 and base not shown. The pressure then measured becomes lower than that in the case where the hermeticity between the top cover 100 and base is kept. However, since a position where the gas leaks to the outside is restricted in between the top cover 100 and base, this does not become judgment material for the presence of the breather filter 102.

Next, a modified example (hereinafter, a second embodiment) of this embodiment (hereinafter, a first embodiment) described above will be described. In addition, in regard to the second embodiment, only main difference from the first embodiment will be described.

Figure 6:
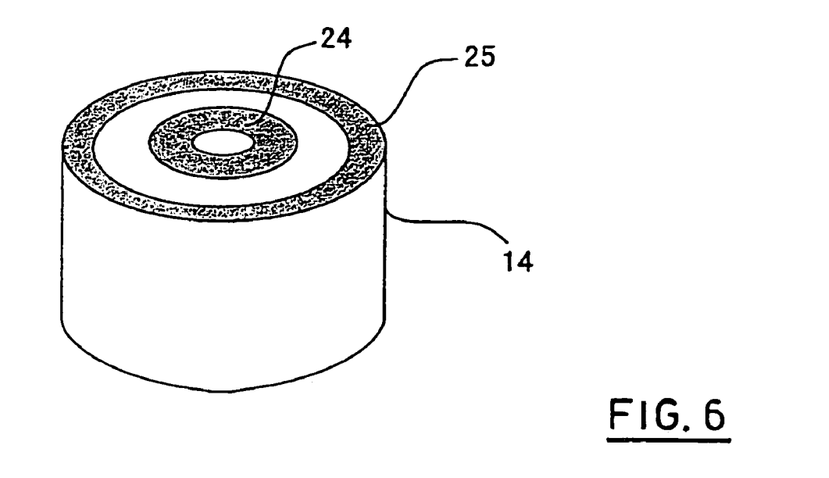
FIG. 6 is a perspective view showing a breather filter according to a second embodiment.
Figure 7:
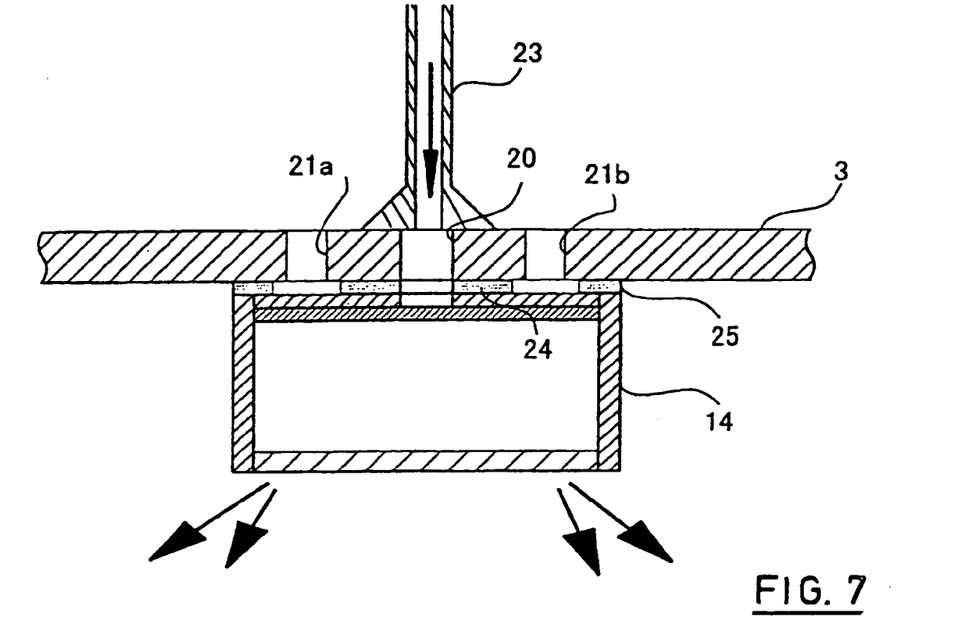
FIG. 7 is a sectional view showing the breather filter attachment portion according to the second embodiment at the time of a leak test.
Figure 8:
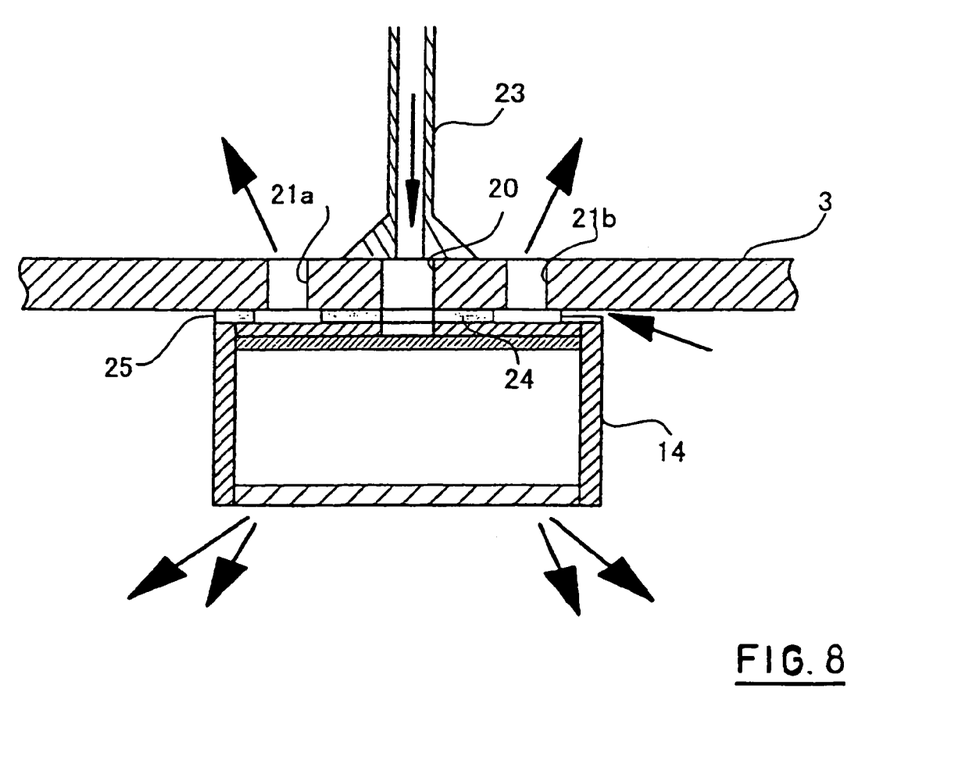
FIG. 8 is a sectional view showing a breather filter attachment portion according to the second embodiment at the time of a leak test.

FIGS. 6 to 8 are drawings for describing the second embodiment. In FIGS. 6 to 8, the same reference numerals will be assigned to parts the same as those described in the first embodiment, and their description is omitted.

In FIG. 6, two pieces of ring-shaped double-sided adhesive tape 24 and 25 for attaching the breather filter 14 to the top cover 3 are stuck on one end face of the cylindrical breather filter 14. The second embodiment is characterized in the point of using the two pieces of double-sided adhesive tape 24 and 25, which are rings having diameters different from each other, like this.

FIG. 7 is a sectional view showing a state of performing a leak test for the HDD 1 where the breather filter 14 is attached with the two pieces of ring-like double-sided adhesive tape 24 and 25. As shown in FIG. 7, a gap between two pieces of double-sided adhesive tapes 24 and 25 corresponds to the filter confirmation holes 21*a* and 21*b* formed in the top cover 3. FIG. 7 shows the case where the breather filter 14 is adequately attached to the top cover 3. The compressed gas (shown by arrows) supplied from the leak test tube 23 is supplied in the disk enclosure 4 through the breather filter 14. Here, the filter confirmation holes 21*a* and 21*b* are isolated in the disk enclosure 4 with the breather filter 14. That is, the filter confirmation holes 21*a* and 21*b* are substantially sealed by the breather filter 14. This state is the same as that of the first embodiment.

FIG. 8 is a sectional view showing a state of performing a leak test for the HDD 1 where the double-sided adhesive tape 25 is not sufficiently stuck. The compressed gas (shown by arrows) supplied from the leak test tube 23 is supplied in the disk enclosure 4 through the breather filter 14. As shown by arrows, a part of supplied gas flows in between the breather filter 14 and top cover 3 from the insufficient stuck portion of the double-sided adhesive tape 25, and further leaks to the outside from the filter confirmation holes 21*a* and 21*b*. As described in the first embodiment, it is possible to detect the leakage of this gas to the outside by measuring the pressure of the compressed gas. That is, by adopting the structure in the second embodiment, it is possible to easily detect the insufficient attachment of the breather filter 14 to the top cover 3.

Figure 9:
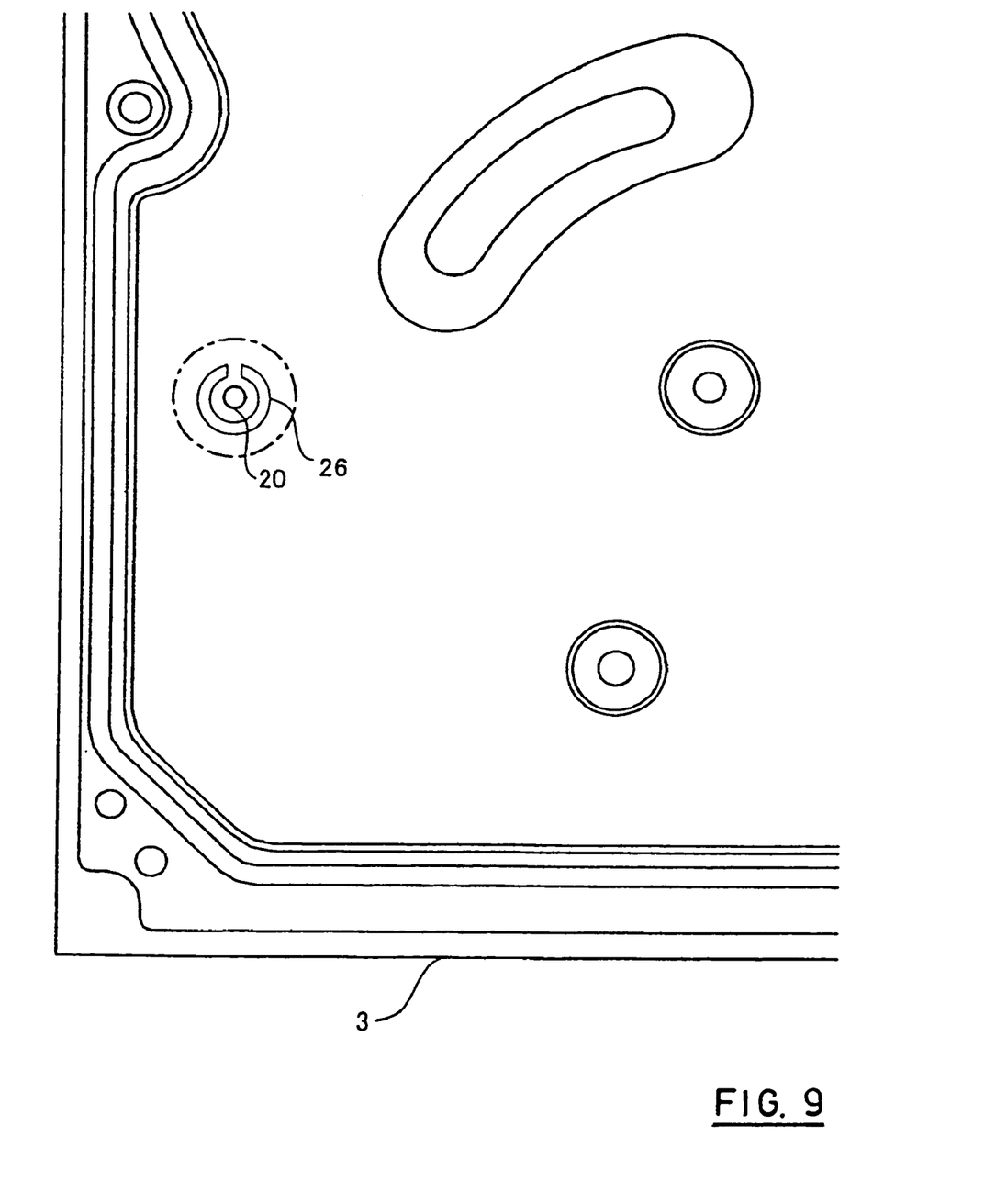
FIG. 9 is a plan showing a formation example of a through hole according to a third embodiment.

In the first and second embodiments described above, the examples in each of which two filter confirmation holes 21*a* and 21*b* are formed in the symmetrical positions in the circumference of the fresh air hole 20. However, the filter confirmation holes 21*a* and 21*b* are not limited to this form. For example, it is possible to make them have forms as shown in FIG. 9 (third embodiment) or FIG. 10 (fourth embodiment). In addition, in FIGS. 9 and 10, the same reference numerals are assigned to the parts that are the same as or equivalent to those in the first and second embodiments.

Figure 10:
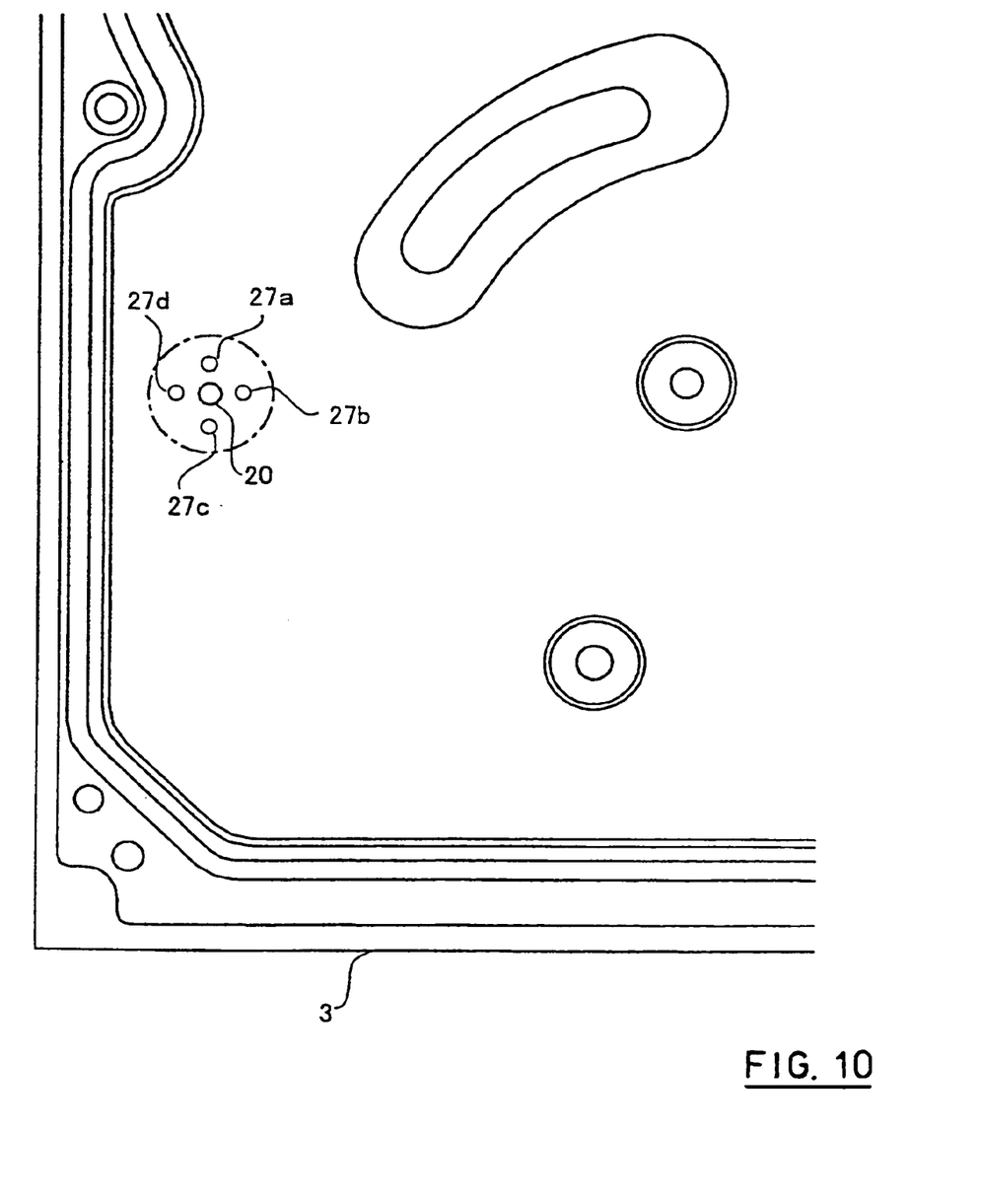
FIG. 10 is a plan showing a formation example of a through hole according to a fourth embodiment.

FIGS. 9 and 10 are partial plans each showing a back face of the top cover 3. In each of FIGS. 9 and 10, a circle shown by a chain line that encloses the circumference of the fresh air hole 20 shows an area where the breather filter 14 will be attached. The third embodiment shown in FIG. 9 is an example in which a circular filter confirmation hole 26 centering the fresh air hole 20 is formed. This filter confirmation hole 26 can be formed by stamping performed by press working. Moreover, the fourth embodiment shown in FIG. 10 is an example where four filter confirmation holes 27*a*, 27*b*, 27*c*, and 27*d* are formed in the symmetrical positions with centering about the fresh air hole 20.

It is possible to precisely detect the insufficient attachment of the breather filter 14 by forming the filter confirmation hole 26 and so on like the third embodiment shown in FIG. 9 and the fourth embodiment shown in FIG. 10 so that the filter confirmation hole 26 may surround the fresh air hole 20. That is, if only one circular confirmation hole is formed, it is surely possible to detect the absence of the breather filter 14 to be attached to the top cover 3. However, if the breather filter 14 is not sufficiently attached and a part insufficiently attached is apart from the filter confirmation hole 26 and the like, it may be undetectable. On the other hand, if the filter confirmation hole 26 and the like are formed like the third and fourth embodiments so that the filter confirmation hole 26 and the like may surround the fresh air hole 20, there is hardly a possibility that the part insufficiently attached is apart from the filter confirmation hole 26 and the like. Therefore, it is possible to detect the presence of the part insufficiently attached with more sufficient precision.

In addition, in the present invention, if the breather filter 14 is not attached or is insufficiently attached due to insufficient adhesion of the double-sided adhesive tape etc., both cases are generally called "inadequate attachment".

As described above, according to this embodiment, it is possible to easily confirm whether the breather filter 14 is attached or is inadequately attached by performing the leak test that has been performed for the HDD 1 heretofore.

In addition, in each of the above-described embodiments, an example where the breather filter 14 is attached to the top cover 3 is described. However, it is apparent that there are also HDDs in each of which the breather filter 14 is attached to the base 2, and in this type of HDD, what is necessary is just to form a fresh air hole in the base 2 and to form a filter confirmation hole in the base 2 according to the above description. In this case, since the breather filter 14 is stuck on the bottom face of the base 2, a fresh air hole as a first ventilation path and a filter confirmation hole as a second ventilation path can be formed on the bottom face of the base 2 shown in FIG. 1. In this case, the filter confirmation hole as the second ventilation path is formed in an area where the breather filter 14 will be attached.

Moreover, in the above-described embodiment, an example of a leak test where a compressed gas is supplied in the disk enclosure 4, that is, the inside of the disk enclosure 4 is pressurized is described. However, it is apparent that it is also possible to realize a leak test by decompressing the inside of the disk enclosure 4, and even in such a case, it is possible to enjoy effects of the present invention.

Furthermore, in the above embodiment, although the cylindrical breather filter 14 is described, the breather filter 14 used for the present invention is not restricted to a cylindrical form. For example, the breather filter 14 having a polygonal cross section such as a triangular prism, can also be used. In addition, in that case, what is necessary is just to form the first and second ventilation paths having forms corresponding to the internal structure of the breather filter 14 such as a ventilation slot that has another form.

The present invention also comprises a method of inspecting a disk drive apparatus, including the following steps: a compressing and decompressing step of compressing and decompressing the inside of the enclosure; a measuring step of measuring pressure in the enclosure; and a judging step of judging whether attachment of the filter is adequate on the basis of a value of the pressure measured. In this embodiment of the method, the enclosure may include a ventilation path where, in case of inadequate attachment of the filter, at the compressing and decompressing step, a gas inside the enclosure leaks to the outside when the inside of the enclosure is compressed, and a gas flows into the inside of the enclosure when the inside of the enclosure is decompressed. In addition, this embodiment of the method may comprise the following step: whether attachment of the filter is adequate includes that the filter is not attached to the enclosure, and/or that attachment of the filter to the enclosure is insufficient.

ADVANTAGES OF THE INVENTION

As described above, according to the present invention, even after a top cover is assembled to a base, it is possible to easily confirm whether a breather filter is attached. Moreover, according to the present invention, even after a top cover is assembled to a base, it is possible to easily confirm whether a breather filter is adequately attached to the top cover.

What is claimed is:

1. A disk drive apparatus, comprising:
    a disk-like medium that is rotatably driven with centering about a rotating shaft and stores data;
    an actuator that has a head, which reads data from and writes data to the disk-like medium, and swings with centering about a rotating shaft;
    an enclosure containing the disk-like medium and the actuator;
    a filter attached to the enclosure for filtering gas circulated between an inside of the enclosure and an outside; and
    said enclosure including first and second ventilation paths for circulating gas between the outside and the filter wherein said second ventilation path is formed in an area in which the filter is attached and is a different path than said first ventilation path.

2. The disk drive apparatus according to claim 1, wherein said enclosure comprises a plurality of second ventilation paths.

3. The disk drive apparatus according to claim 2, wherein the plurality of second ventilation paths are formed in positions symmetrical with respect to the first ventilation path.

4. The disk drive apparatus as claimed in claim 1, further comprising:
    a spindle motor rotatably driving the disk like medium;
    the enclosure containing the disk like medium, the spindle motor, and the actuator, and further includes a box-like base having an opening, and a cover sealing the opening.

5. The disk drive apparatus according to claim 4, wherein said filter is attached to the disk enclosure with an adhesive.

6. The disk drive apparatus according to claim 4, wherein said first ventilation path and said second ventilation path are formed in the cover, and the filter is attached to the cover.

7. The disk drive apparatus according to claim 4, wherein said second ventilation path is formed in a position where the gas leaks from the second ventilation path to the outside when the filter is not attached to the cover.

8. A method of inspecting a disk drive apparatus that comprises an enclosure which contains a disk-like medium storing data, and a head that reads data from and writes data to the disk-like medium, and a filter which is attached to the inside of the enclosure and achieves a filtration function with maintaining ventilation with the outside, comprising:
    a compressing and decompressing step of compressing and decompressing the inside of the enclosure;
    a measuring step of measuring pressure in the enclosure; and
    a judging step of judging whether attachment of the filter is adequate on the basis of a value of the pressure measured.

9. The method of inspecting a disk drive apparatus according to claim 8, wherein said enclosure has a ventilation path where, in case of inadequate attachment of the filter, at the compressing and decompressing step, a gas inside the enclosure leaks to the outside when the inside of the enclosure is compressed, and a gas flows into the inside of the enclosure when the inside of the enclosure is decompressed.

10. The method of inspecting the disk drive apparatus according to claim 8, wherein whether attachment of the filter is adequate includes that the filter is not attached to the enclosure, and/or that attachment of the filter to the enclosure is insufficient.

* * * * *